United States Patent Office 3,017,277
Patented Jan. 16, 1962

---

3,017,277
PROCESS FOR PRESERVING YELLOW PEPPERS
Mitchell S. Root, % Allied Foods, 4116 Whiteside St.,
Los Angeles, Calif.
No Drawing. Filed June 1, 1959, Ser. No. 817,028
1 Claim. (Cl. 99—156)

This invention relates to the treatment of peppers, such as of the banana wax variety, for preparing them for sale in sealed containers or jars. The process may be used with equal success for the preservation and preparation of other types of yellow peppers, which may be of the "hot" variety. The peppers have a characteristic conical form.

It has been common in the past to store peppers in barrels filled with brine, and permitting some fermentation; as the peppers were needed, they were put into jars filled with vinegar and brine at room temperature. In another prior process, fresh peppers were placed in jars, and then hot brine, including vinegar, was poured over them. After this, the jars were sealed.

It has been noted that the peppers treated in this way tended to be flattened, and the flesh lost some of its crispness. The excessive salinity also had an undesired effect on the taste.

It is one of the objects of this invention to obviate these objections, and to make it possible to preserve the crispiness as well as the attractive yellow color of the peppers.

It is another object of this invention to improve, in general, the process of preparing and preserving yellow peppers.

Although but one form of the process will be described in detail, the invention need not be limited thereto, since the scope of the invention is best determined by aid of the appended claim.

In preparing the peppers, they are first of all carefully washed. This is a relatively simple operation effected by usual means, since the skin is quite smooth from which foreign matter can be readily rinsed away.

A solution at room temperature of approximately the following proportions is then provided into which the peppers are immersed.

The solution includes sufficient water to produce fifty gallons of brine. Each fifty-gallon batch includes sufficient acetic acid or vinegar to provide about forty-grain acidity. Enough salt is added to produce a salinity of about ten degrees, as measured on the salometer; to this are added about an ounce of turmeric in liquid form and nine ounces of sodium bisulfite in solid form.

The peppers are placed into containers, such as jars, and the containers are then filled with the brine. The containers are then closed and sealed. They are then placed in a heated water bath to raise the temperature of the bath until a temperature of from 150° F. to 165° F. is obtained. Upon cooling, the containers may be appropriately labelled and packed.

The inclusion in the brine of color (tumeric) and a bleach (sodium sulfite), and the provision of a mild salinity enhance the attractiveness of the pack. Furthermore, the fresh crispiness is more completely preserved. Since only a very small amount of turmeric is used, the brine appears substantially transparent in spite of the fact that the turmeric lends a bright fresh color to the peppers.

The inventor claims:

The process of preserving yellow peppers, which comprises: preparing a saline acid brine; the salinity being about ten degrees and the acidity about forty grain; adding sodium bisulfite to the solution in about the proportion of nine ounces to each batch of fifty gallons; placing the peppers into a container; filling the container with the brine; closing and sealing the container; and subjecting the container and its contents to a temperature of about 165° F.

References Cited in the file of this patent

UNITED STATES PATENTS

| | | |
|---|---|---|
| 1,889,123 | Jones | Nov. 29, 1932 |
| 2,444,875 | Hayes | July 6, 1948 |
| 2,587,466 | Harris | Feb. 26, 1952 |
| 2,649,378 | Traisman | Aug. 18, 1953 |

OTHER REFERENCES

Potato Processing, Talburt and Smith, 1959, pages 427 to 430.